(12) United States Patent
Jungert

(10) Patent No.: US 7,992,922 B2
(45) Date of Patent: Aug. 9, 2011

(54) WING ELEMENT

(75) Inventor: Dieter Jungert, Weissach (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 3 days.

(21) Appl. No.: 12/426,522

(22) Filed: Apr. 20, 2009

(65) Prior Publication Data

US 2009/0284042 A1 Nov. 19, 2009

(30) Foreign Application Priority Data

May 15, 2008 (DE) .......................... 10 2008 023 738

(51) Int. Cl.
*B60J 7/00* (2006.01)
(52) U.S. Cl. ................ 296/180.1; 296/180.2; 296/180.3
(58) Field of Classification Search ............... 296/180.1, 296/180.2, 180.3, 180.4, 180.5
See application file for complete search history.

(56) References Cited

U.S. PATENT DOCUMENTS 7,331,273 B2 * 2/2008 Kerekes et al. ................ 92/92
2005/0248184 A1 * 11/2005 Piffaretti .................. 296/187.03

FOREIGN PATENT DOCUMENTS

DE 3534169 A1 3/1987
DE 100 02 511 8/2001

* cited by examiner

*Primary Examiner* — Joseph D Pape
(74) *Attorney, Agent, or Firm* — Gerald E. Hespos; Michael J. Porco

(57) ABSTRACT

A wing element (W) on the spoiler (S) of a motor vehicle is characterized in that the lower side (U', U") of the wing element is provided in a manner to substantially planar below a limit speed and therefore has a small end surface in the direction of travel of the motor vehicle, and an aerodynamic profiling of the lower side, and therefore an increased end surface, is provided above said limit speed.

13 Claims, 1 Drawing Sheet

WING ELEMENT

CROSS REFERENCE TO RELATED APPLICATION

This application claims priority under 35 USC 119 to German Patent Application No. 10 2008 023 738.8 filed on May 15, 2008, the entire disclosure of which is incorporated herein by reference.

BACKGROUND OF THE INVENTION

1. Field of the Invention

The invention relates to a wing element on the spoiler of a motor vehicle.

2. Description of the Related Art

Motor vehicles are subject to lifting forces at increasing speed and these lifting forces reduce the ground adhesion of the motor vehicle. As a result, high-performance vehicles with highly streamlined configurations can face critical situations when operating at high speeds. Some motor vehicles are equipped with spoilers in their rear region to improve the handling performance. The spoilers comprise a substantially horizontal wing that is spaced from the vehicle body and is arranged transversely with respect to the direction of travel. The lower side of the wing has an aerodynamic profiling (curvature) to obtain an increased downward force for the motor vehicle. The curvature on the lower side of the spoiler is analogous to an upside-down airfoil of an aircraft, and hence the downward force on a motor vehicle increases as the curvature on the lower side of the spoiler wing increases. However, a greatly curved lower side also leads to an increased end surface of the wing and causes increased drag on the motor vehicle and greater fuel consumption for the motor vehicle. Therefore, spoilers of this type generally are moveable and extend out of the vehicle body only above a specified limit speed for deploying their aerodynamic effect. However, a moveable spoiler requires a relatively complicated mechanism for controlling the extension and retraction, and also requires a corresponding receiving region within the vehicle body. A spoiler of this type is known, for example, from DE 10002511.

Separation edges on the motor vehicle should be differentiated from spoilers of this type. The separation edges also produce an aerodynamic effect, but they do so in accordance with a completely different physical principle. In particular, in contrast to wings on a spoiler, air does not flow entirely around separation edges, and therefore separation edges do not have a lower side comparable to the lower side of a wing on a spoiler.

SUMMARY OF THE INVENTION

The invention relates to an improved spoiler for a motor vehicle. The spoiler of the subject invention has a wing element with a lower side that is substantially planar below a specified limit speed of the motor vehicle. Thus the wing element of the spoiler has a small end surface in the direction of travel of the motor vehicle when the vehicle is operating below the specified limit speed. However, aerodynamic profiling is provided to the lower side of the wing element of the spoiler when the vehicle is operating above the limit speed. Accordingly, the end surface area of the spoiler increases only when the vehicle is operated above the limit speed. As a result, the wing element of the spoiler has a small end surface at low travel speeds and therefore contributes to low fuel consumption for the motor vehicle at low speeds of travel. Aerodynamic profiling of the wing element is generated at high travel speeds and therefore the wing element produces a desired downward force on the motor vehicle at high travel speeds. A complicated mechanism for extending the wing element from the motor vehicle body and retracting the wing element into the motor vehicle body is unnecessary to achieve the desired effects of the subject invention. On the contrary, only the lower side of the wing element has to be deformed suitably. The invention provides a structurally efficient and effective alternative to construction space problems with respect to the arrangement of the drive and/or guides of a moveable wing element. Therefore, the rigid arrangement of the wing element on the motor vehicle body is of particular advantage. The aerodynamic profiling of the lower side of the wing element may include a mere partial deformation of the lower side. For example, the aerodynamic profiling may be produced selectively at the outer left and right parts, a front, rear and/or central part of the lower side of the wing element, or of any combinations thereof.

A particularly good aerodynamic effect, i.e. optimized down force at high speeds of the motor vehicle, arises if the aerodynamic profiling of the lower side of the wing element is provided essentially over the entire width of the wing element, i.e. from the left side to the right side of the motor vehicle. A wing element of a spoiler usually extends over most of the width of the motor vehicle, and hence aerodynamic profiling across the entire width is particularly effective.

The aerodynamic profiling of the wing element may be varied selectively for different limit speeds. More particularly, the aerodynamic profiling can be more prominent as the limit speed increases, i.e. with an increasing end surface and therefore with increased downward force. As an alternative, the aerodynamic profiling can be at its most prominent at the lowest limit speed and can become less prominent as the limit speed increases further. Therefore a compromise can be obtained between fuel consumption and downward force. Accordingly, the shape of the wing element can be adapted in a plurality of steps and can be optimized for different speed ranges.

The wing element preferably is infinitely variably adjustable at least within a speed range to achieve optimum adaptation. More particularly, the aerodynamic profiling can be infinitely variably adjustable between a lower limit speed and an upper limit speed, as a function of the selected technical realization of the wing element.

The wing element preferably has a substantially rigid body and an inflatable element preferably is provided on the lower side of the rigid body. The inflatable element can be filled and emptied as a function of the speed of the motor vehicle. This structurally simple solution permits a desired aerodynamic profiling of the wing element by appropriately filling the inflatable element with a suitable medium or letting the medium out of the inflatable element.

The inflatable element preferably is not filled below a first limit speed. As a result, the inflatable element bears flat against the lower side of the substantially rigid wing body. The uninflated condition results in a small end surface and therefore a low fuel consumption for the motor vehicle below the first limit speed.

The inflatable element preferably is provided as a bag-like part, in particular made of elastomer or rubber, for filling with air in accordance with a desired, speed-dependent, aerodynamic profiling. Compressed air already is available in many conventional motor vehicles. Therefore, the motor vehicle merely needs a corresponding feed line to the wing element and means for controlling the quantity of air to be provided.

As an alternative, a supply of compressed air for the wing element can be provided independent of the motor vehicle.

DETAILED DESCRIPTION OF THE PREFERRED EMBODIMENT

Figure 1:
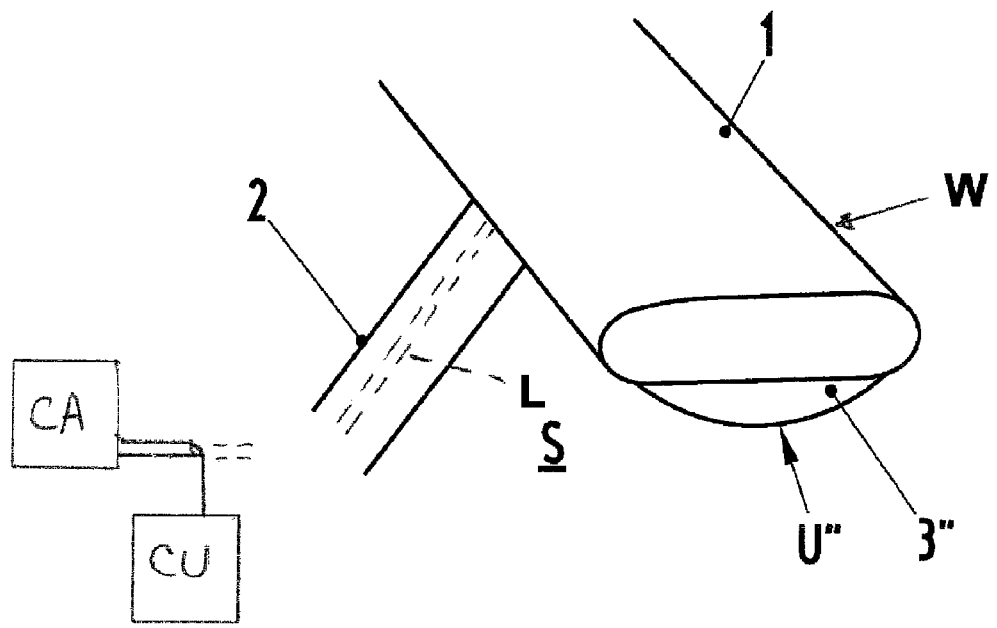
FIG. 1 is a schematic illustration of a wing element in accordance with the invention above a limit speed with aerodynamic profiling on the lower surface to achieve an increased downward force on the motor vehicle.
Figure 2:
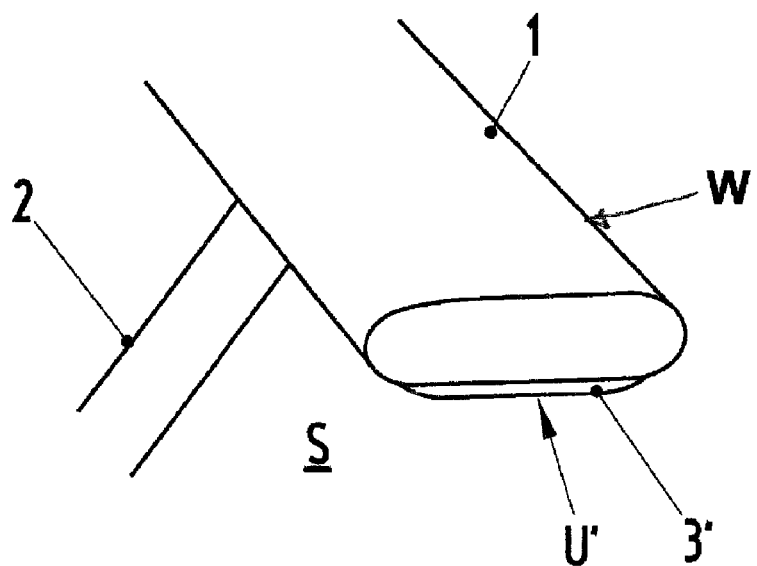
FIG. 2 is a schematic illustration of the wing element below a limit speed with substantially no aerodynamic profiling on the lower surface.

A spoiler for a motor vehicle in accordance with the invention is identified generally by the letter S in FIGS. 1 and 2. The spoiler S includes a wing element W supported in spaced relationship to the body of a motor vehicle by two retaining struts 2, only one of which is illustrated. The retaining struts 2 are fixed in this embodiment and may be aluminum tubes.

The wing element W comprises a substantially rigid body 1 that can be made, for example, from glass fiber, reinforced plastic or carbon fiber reinforced plastic. A bag-like part 3', 3" is fastened to the lower side of the rigid body 1a, for example by adhesive bonding or welding and is formed from elastomer or rubber. The lower side U', U" of the bag-like part 3', 3" consequently forms the lower side of the wing element W. The bag-like part 3', 3" extends over the entire length of the rigid body 1, which corresponds to the entire width of the spoiler S. The bag-like part 3', 3" can be supplied with compressed air from a supply of compressed air CA the motor vehicle via a feed line L that is guided, for example, through the retaining strut 2. The flow of compressed air is controlled by a control unit CU that is operatively connected to the speedometer of the motor vehicle and to one or more valves in the feed line L between the supply of compressed air CA and the bag-like part 3', 3".

The bag-like part 3' is empty, as illustrated in FIG. 2, when the motor vehicle is operated below a limit speed, for example a speed between 90 and 120 km/h. The bag-like part 3' therefore bears flat against the substantially planar lower side of the rigid body 1. The bag-like part 3' has only a small wall thickness. Thus, the lower side U' of the wing element W remains substantially planar. The end surface of the wing element W therefore scarcely is increased and results in a desired low drag at low speeds of the motor vehicle.

The bag-like part 3" is filled with compressed air above the limit speed, as illustrated in FIG. 1. As a result, a desired aerodynamic profiling is produced by a corresponding configuration or stiffened portions within the bag-like part 3". Therefore, the lower side U" of the wing element W is no longer substantially planar, but rather has a curvature in the manner of an upside-down airfoil. As a result, a desired downward force effect is obtained at higher speeds of the motor vehicle. The bag-like part 3', 3" is emptied as soon as the speed of the motor vehicle drops below the limit speed. As a result, the bag-like part 3', 3" collapses in a controlled manner, and again produces the substantially flat lower side of the wing element W.

Plural limit speeds can be provided, each of which is associated with a differing degree of aerodynamic profiling, and/or aerodynamic profiling can be adjusted with infinite variability by selectively filling or emptying the bag-like part 3', 3". In addition, different operative mechanisms can be used instead of a bag-like part for the desired adjustment of the aerodynamic profiling. For example, a spindle drive can be provided at both lateral ends of the wing to brace the lower side of the wing mechanically in the longitudinal direction of the motor vehicle. In this case, the lower side of the wing can be a fiber mat or in the form of an element that can be braced. The lower side of the wing can have a variable fiber density or a profiled thickness profile in the longitudinal direction thereof to provide a definable deformation when a mechanical stress is applied to the lower side of the wing. Piezo-electromechanical elements on the lower side of the wing also can define a further mechanism for adjusting the aerodynamic profiling.

What is claimed is:

1. A wing element of a motor vehicle, the wing element comprising: a substantially rigid body having a lower side that is substantially planar below a limit speed so that the wing element has a specified front profile below the limit speed, and an inflatable element on the lower side of the rigid body, the inflatable element being in communication with a supply of compressed air that is controlled by a control unit for filling the inflatable element as a function of speed of the motor vehicle above the limit speed so that the lower side of the wing element has an aerodynamic profiling above the limit speed and an increased front profile above the limit speed that is larger than the specified front profile below the limit speed.

2. The wing element of claim 1, wherein the aerodynamic profiling extends essentially over an entire width of the wing element.

3. The wing element of claim 1, wherein the limit speed is a first limit speed, and wherein the control unit provides plural limit speeds each of which has a different aerodynamic profiling of the wing element.

4. The wing element of claim 1, wherein range of variably adjustable aerodynamic profiling is provided within a speed range.

5. The wing element of claim 1, wherein the inflatable element is provided in a manner such that it is not filled below a first limit speed.

6. The wing element of claim 1, wherein the inflatable element is a baglike part made of elastomer or rubber for filling with air.

7. A spoiler for a motor vehicle, comprising: at least one fixed strut extending rigidly and from the motor vehicle, a wing connected rigidly to the struts, the wing including a rigid body having a substantially planar lower surface, an expandable member fixed to the lower surface of the rigid body and means for selectively expanding the expandable member in response to at least one specified limit speed of the motor vehicle.

8. The spoiler of claim 7, wherein the expandable member is an inflatable baglike part, the means for selectively expanding the expandable member comprising a compressed air feed line extending through the strut.

9. The spoiler of claim 8, wherein the means for selectively expanding the expandable member further comprises a control unit for sensing speed of the motor vehicle, for directing a flow of compressed air through the compressed air feed line to the expandable member in response to a sensed speed above the at least one specified limit speed and for releasing air from the expandable member in response to a sensed speed below the at least one specified limit speed.

10. A method for changing an aerodynamic performance of a wing element of a motor vehicle, comprising:
measuring an actual speed of the motor vehicle;
comparing the measured actual speed of the motor vehicle to at least one specified limit speed;

deforming a lower surface of the wing element down from an initial shape to define a convexly curved aerodynamic shape when the measured actual speed of the motor vehicle exceeds the at least one specified limit speed; and returning the lower surface of the wing element to the initial shape when the measured actual speed of the vehicle is less than the at least one specified limit speed, wherein an aerodynamic profiling of differing prominence is provided as a function of measured actual speed of the motor vehicle.

11. The method of claim 10, wherein the aerodynamic profiling is provided to the wing element by expanding a lower part of the wing element at speeds above the at least one specified limit speed.

12. The method of claim 11, wherein the lower part of the wing element is expanded by directing compressed air into a baglike part of the wing element.

13. The method of claim 11, wherein the aerodynamic profiling is provided variably as a function of speed.

\* \* \* \* \*